April 6, 1937.  J. V. SCHAFER  2,076,097
FISHING REEL
Original Filed Dec. 26, 1933  2 Sheets-Sheet 1
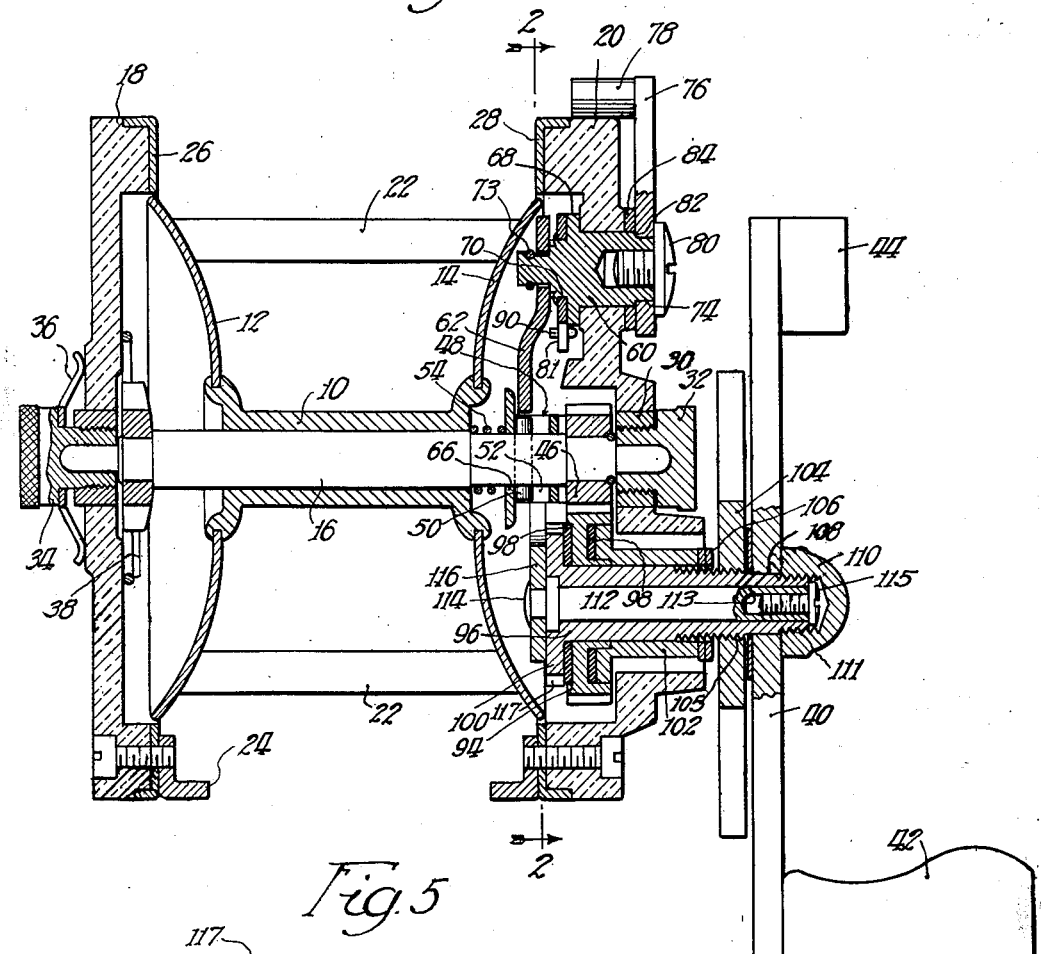
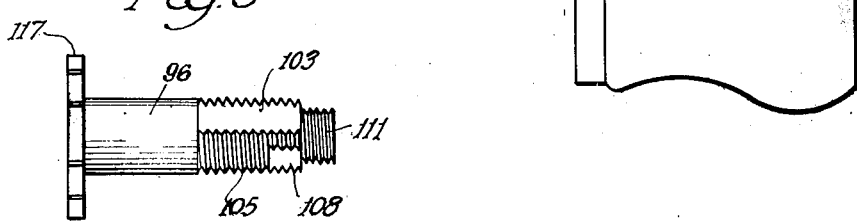
Inventor
John V. Schafer.
By Freeman and Sweet Attys.

April 6, 1937.　　　J. V. SCHAFER　　　2,076,097
FISHING REEL
Original Filed Dec. 26, 1933　　2 Sheets-Sheet 2
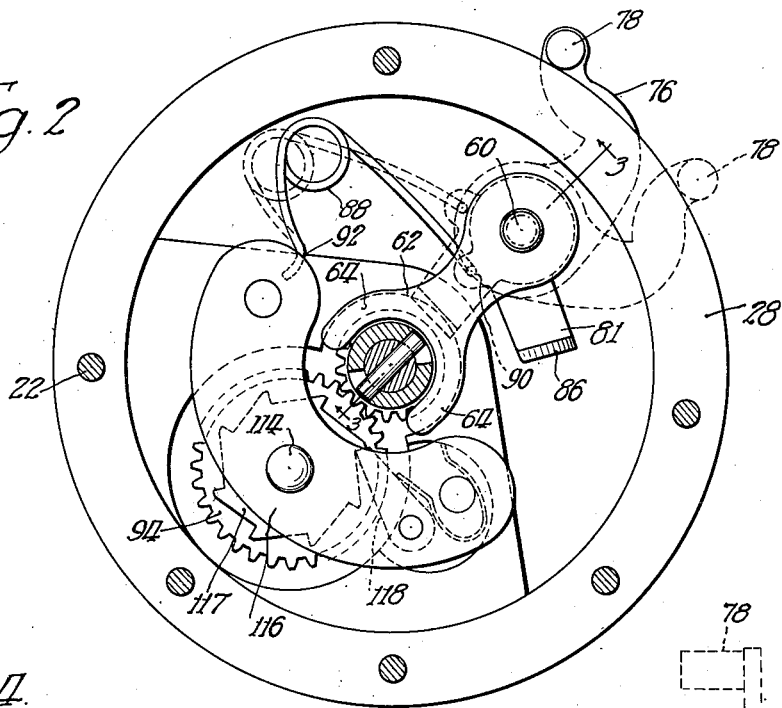
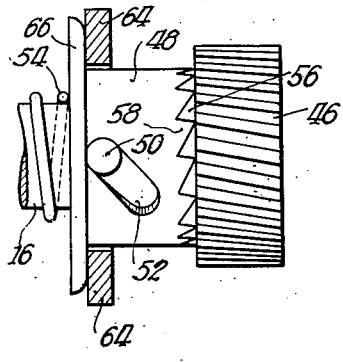
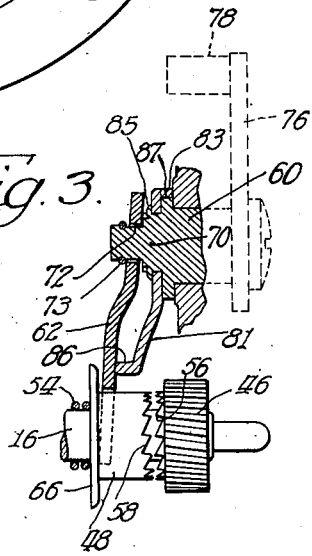
Inventor
John V. Schafer
By: Freeman and Sweet Attys.

Patented Apr. 6, 1937

2,076,097

UNITED STATES PATENT OFFICE 2,076,097

FISHING REEL

John V. Schafer, Bronson, Mich., assignor to Bronson Reel Company, Bronson, Mich., a corporation of Michigan Application December 26, 1933, Serial No. 703,918
Renewed September 8, 1936

10 Claims. (Cl. 242—84.7)

My invention relates to fishing reels and includes among its objects and advantages greater certainty of operation, particularly with respect to connecting and disconnecting the spool, and keeping the spool connected while playing a fish.

In the accompanying drawings:

Figure 1 is a central axial section of a fishing reel embodying the invention;

Figure 2 is a section of line 2—2 of Figure 1;

Figure 3 is a fragmentary section on line 3—3 of Figure 2;

Figure 4 is an enlarged elevation of a clutch element proper and the parts immediately cooperating therewith; and Figure 5 is an elevation of the main drive sleeve.

In the embodiment selected to illustrate the invention the reel includes the usual spool made up of a tube 10 and end flanges 12 and 14. The tube 10 is a driving fit on the shaft 16.

The frame supporting and guiding the spool is made up of end plates 18 and 20 interconnected by pillars 22 and by the seat member 24. The end plates illustrated are of non-metallic material and are provided with annular metallic facings 26 and 28, the inner edges of which terminate adjacent the outer edges of the spool flanges 12 and 14.

The end plates 18 and 20 provide pivotal supports for the ends of the shaft 16. The support in the end plate 20 comprises a metallic insert 30 into which the bearing member proper 32 is threaded and screwed home until its flange strikes insert 30. The bearing member 34 at the other end of the shaft is frictionally held against rotation by a spider 36 so as to be adjustable to limit the end play of the shaft. The end plate 18 may also carry any suitable or usual click mechanism indicated as a whole by the reference character 38. As the details of this mechanism are old in the art and per se form no part of the present invention, this description has not been encumbered with the details of the click mechanism.

A driving crank 40 is pivotally supported by the end plate 20 for rotation on an axis parallel to but offset from the axis of the shaft 16. The crank 40 is provided with the usual handle 42 at one end and a counterweight 44 at the other end to balance the crank. I have provided transmission means from the crank 40 to the shaft 16 including adjustable friction braking and transmission means and clutch means between the friction brake and the spool for connecting or disconnecting the transmission.

The pinion 46 is rotatable but not axially slidable on the shaft 16, and encircling the shaft 16 is a clutch element 48. The driving connection between the element 48 and the shaft 16 is by means of a pin 50 fixed in the shaft, and a substantially helical slot 52 in the clutch element. This permits a predetermined limited lost motion between the element 48 and the shaft 16, involving helical displacement of the element 48 with respect to the shaft 16. A coil spring 54 acting in compression normally biases the clutch element 48 into the position shown in Figures 1 and 4.

The pinion 46 and clutch element 48 are provided with cooperating clutch teeth 56 and 58, respectively. The driving faces of the teeth are not parallel to the axis of the shaft 16 but are inclined helically at an angle of approximately 8° thereto. The helical inclination of the tooth faces is in the same sense as the inclination of the slot 52, as clearly shown in Figure 4, both inclinations being in the sense of a right handed screw thread. However, the pitch, or equivalent axial displacement per unit of angular displacement, is very much less for the slot 52 than it is for the faces of the clutch teeth.

It will be obvious that a driving torque tending to force the pin 50 downward from the position of Figure 4 will also develop an axial force tending to resist any displacement of the element 48 to the left by reason of the engagement of the pin 50 with the inclined slot 52. If there were no friction, the tendency of the faces of the clutch teeth to slip would develop an axial force tending to throw the clutch out of engagement in opposition to the axial force developed by the pin 50, but even if there were no friction, this axial force would be much smaller than the opposing axial force of the pin 50, so that the clutch and pinion are positively held in the interlocked relationship of Figure 4 whenever a load is being transmitted, and the force tending to hold them together is proportionate to the load. As a matter of fact, when friction is taken into account, the helical inclination of the faces of the clutch teeth is such that the tendency of the clutch teeth to disengage is roughly of the same order of magnitude as the frictional resistance to slippage between the driving faces of the teeth. The inclination of the teeth 56 and 58 eliminates any possibility of sticking when the transmission is not carrying a load and the operator moves the clutch out of engagement.

I have provided manually controlled means for moving the clutch element 48 out of the position of Figure 4 into the disengaged position of Figure 3 against the force of the spring 54. The pintle 60 is journaled in the end plate 20 on an axis parallel to but offset from the axis of the shaft 16. A clutch lever 62 is provided with spaced fingers 64 constituting a yoke adapted to engage the annular face of the flange 66 on the clutch element 48 and move the clutch element out of clutching engagement. The pintle 60 has a flange 68 and two coaxial projections 70, and 72 of successively decreasing diameters. The other end of the lever 62 has an aperture slightly larger than the last projection 72, through which aperture the projection passes. A spring ring 73 is seated in an annular groove near the end of the projection 72 and retains the lever 62 in loosely assembled relation, free to pivot from the position of Figure 1 to that of Figure 3.

The outer end of the pintle 60 is squared at 74 and receives the crank arm 76 provided with a small handle 78. The retaining screw 80 holds the crank arm against the shoulder 82 on the pintle, and a washer 84 between the crank 76 and the plate 20 reduces friction. A rigid arm 81 carries a cam surface 86 at its outer end. The arm 81 receives the projection 70 and is locked on the pintle by a lug 83 entering a notch 87 in the flange 68, and fastened against the flange 68 by small locking lugs 85 broached out of the shoulder of the projection 70. Rotation of the handle 78 from the full line position of Figure 2 to the dotted line position of Figure 2 will move the cam 86 under the middle portion of the clutch operating lever 62 and rock it from the position of Figure 1 to the position of Figure 3.

I have provided biasing means for assuring movement of the cam 86 completely from one extreme position to the other whenever it is actuated. The spring 88 is pivotally connected at 90 to the pintle 60 and tends to push away from its anchor 92. Movement of the arm 81 in either direction past a point substantially midway between the two positions indicated in Figure 2 carries the spring past dead center and the balance of the movement is quickly completed by the action of the spring.

The means for rotating the pinion 46 comprises a gear 94 continuously in mesh with the pinion. The gear 94 is freely rotatable on a sleeve 96, subject to the rubbing action of two annular friction disks 98 that tend to compel the gear to turn with the sleeve 96. The sleeve is provided with an annular abutment 100 for one of the friction disks 98 and an outer sleeve 102 is operable to compress both friction disks and the web of the gear 94 between itself and the abutment 100. The sleeve 102 is axially slidable but not rotatable with respect to the inner sleeve 96, having a web at its outer end engaging the flattened surfaces 103 on the sleeve.

Threaded on the larger threaded portion 105 of inner sleeve 96 is a brake applying manual control member 104, commonly referred to in the trade as a star wheel. In the position of Figure 1 there is no pressure on the disks 98, and the gear 94 is free to rotate with respect to the sleeve 96. Rotation of the star wheel 104 to move it to the left will bring it in contact with a pair of friction reducing washers 106 and force the sleeve 102 to the left to provide an adjustable amount of friction for driving the gear 94. This friction is commonly adjustable up to amounts sufficient to break the line on the spool, in case the fisherman catches a shark or something too large to handle and prefers to break the line.

The crank 40 engages both the surfaces 103 and two more flat surfaces at 108 on the inner sleeve 96 and is retained in assembled position by a nut 110 threaded on the smaller threaded portion 111 at the end of the sleeve. The sleeve 96 is supported and guided on a stud 112 riveted at 114 to a bridge member 116 affixed to the inner surface of the end plate 20. The periphery of the abutment 100 is provided with teeth 117 adapted to engage a spring pressed pawl 118 and prevent rotation of the sleeve 96 at all times in the direction which would permit the line to be unwound from the spool. The stud 112 is bored at 113 to receive screw 115 which holds the sleeve 96 in place.

In using such a reel, the fisherman disengages the clutch as shown in Figure 3 and casts out his bait. At this time it is desirable that the spool should run freely, but not too freely lest the slowing down of the movement of the bait cause the inertia of the spool and the mass of line wound on it, to overrun and snarl the line. The movement of the parts to the position of Figure 3 causes the prongs 64 to rub against the annular flange 66, which is pressed against them by the spring 54. This slight rubbing action constitutes a line drag just sufficient to safeguard against snarling the line in casting.

When the fisherman desires to discontinue the free paying out of the line, either to hold the bait where it is or to reel it in or because a fish has struck, the handle 78 is moved from the dotted line position of Figure 2 to the full line position. This movement engages the clutch, and the drag as set by the star wheel, rendering the star wheel drag available for holding the line or bait where it is, or reeling in, if necessary. This engagement of the clutch not infrequently happens at a time after a fish has struck, which is naturally a moment of great excitement. It is also a moment when very heavy forces are available to pull on the line the instant the clutch takes hold. However, the camming action of the slot 52 as the clutch element starts from the position of Figure 3 toward the position of Figure 4 is immediately made positive as soon as the toes of the clutch teeth touch each other and the clutch element 48 is rammed home to the position of Figure 4 instantaneously and without any possibility of chewing up the clutch teeth.

Moreover, whenever the fish is taking the line out, the forces acting on the pin 50 due to the pull on the line will be sufficiently powerful so that even the most hysterical of fishermen is unable to accidently disengage the clutch and give the fish a slack line, which would enable the fish to escape.

Thus, while the fish takes line, the fisherman may sit with his hand on the friction star wheel 104 and adjust the friction from time to time to meet any emergency, even to the extent of breaking the line if that should become necessary. An experienced fisherman sets the friction brake at all the line will safely stand and then, even while the fish is taking out line, he has his hand on the handle 42 and is slowly turning the crank in the direction to reel the fish in. This enables him to begin reeling in much more promptly in case the fish turns suddenly and swims toward him. In changing the position of the hand from the grip on the star wheel to a grip on the handle, an unnerved operator is likely to make random movements, and it is not uncommon for the novice to unintentionally unclutch the spool and lose the fish. With the device disclosed, this is impossible whenever there is a substantial load on the line, as there should be at all times while playing the fish.

Without further elaboration, the foregoing will so fully explain the gist of my invention that others may, by applying knowledge current at the time of application, readily adapt the same for use under various conditions of service.

I claim:

1. In a fishing reel, in combination; a spool; a handle; and a transmission adapted to connect said spool and handle; said transmission including a clutch element, and a driving and a driven member between which said clutch element is interposed; said clutch element having a lost motion driving connection with one of said members, and being movable by reason of said lost motion into positive clutching engagement with the other member, or entirely out of engagement, said lost motion driving connection generating a force proportional to the load on the transmission in a direction tending to hold said clutch engaged; spring means biasing said clutch element into clutching engagement; manual means operating in opposition to said spring means and operative only when said transmission is not under load, for moving said clutch element out of clutching engagement and holding it out; said lost motion connection being with the driven element, whereby when said clutch element is out of engagement said clutch moving means imposes its friction load on the spool and that portion of the transmission still connected therewith; and adjustable friction braking means for putting a friction load on the running out movement of the spool, said braking means acting on the transmission at a point between the clutch element and the handle, whereby the braking load prevents the throwing out of the clutch.

2. In a fishing reel, in combination; a spool; a handle; and a transmission adapted to connect said spool and handle; said transmission including a clutch element, and a driving and a driven member between which said clutch element is interposed; said clutch element having a lost motion driving connection with one of said members, and being movable by reason of said lost motion into positive clutching engagement with the other member, or entirely out of engagement, said lost motion driving connection generating a force proportional to the load on the transmission in a direction tending to hold said clutch engaged.

3. In a fishing reel, in combination; a spool; a handle; and a transmission adapted to connect said spool and handle; said transmission including a clutch element, and a driving and a driven member between which said clutch element is interposed; said clutch element having a lost motion driving connection with one of said members, and being movable by reason of said lost motion into positive clutching engagement with the other member, or entirely out of engagement, said lost motion driving connection generating a force proportional to the load on the transmission in a direction tending to hold said clutch engaged; spring means biasing said clutch element into clutching engagement, and manual means operating in opposition to said spring means and operative only when said transmission is not under load, for moving said clutch element out of clutching engagement and holding it out.

4. In a fishing reel, in combination; a spool; a handle; and a transmission adapted to connect said spool and handle; said transmission including a clutch element, and a driving and a driven member between which said clutch element is interposed; said clutch element having a driving connection with one of said members, and being movable into positive clutching engagement with the other member, or entirely out of engagement; spring means biasing said clutch element into clutching engagement, and manual means operating in opposition to said spring means for moving said clutch element out of clutching engagement; said driving connection being with the driven element, whereby when said clutch element is out of engagement said clutch moving means imposes its friction load on the spool and that portion of the transmission still connected therewith.

5. In a fishing reel, in combination, a frame; a spool journaled on said frame; a handle journaled on said frame; a transmission from said handle to said spool; clutch means forming part of said transmission and arranged to be positively held in engagement by a mechanical load on said transmission; manual means for throwing said clutch means out of engagement; ratchet means preventing retrograde rotation of said handle; and adjustable friction brake means between said ratchet means and said clutch means.

6. In a fishing reel, in combination; a spool having end flanges and a shaft; a clutch element coaxial with said spool and encircling said shaft; a driving connection between said spool and said element permitting a predetermined limited amount of lost motion between them by substantially helical movement of said clutch element with respect to said spool, the helical movement having a substantially constant pitch throughout the extent of the lost motion; a driving member coaxial with said clutch element; said clutch element and driving member having opposed cooperating clutch teeth adapted to drive the spool only in the direction of reeling in a line thereon, said clutch teeth having driving faces helically arranged with respect to the axis of the spool; the pitch of the lost motion connection between said spool and said clutch element being relatively low and the pitch of the driving faces being relatively high; resilient means on the spool shaft normally urging said clutch element into clutching engagement with said driving member, said clutch element having an annular abutment surface; a clutch operating lever having one end arranged to engage said abutment surface, a pivotal support for the other end of said lever; cam means engaging said lever intermediate its ends to tilt said lever and disengage said clutch; an end plate cooperating with the adjacent spool flange to form a housing for said driving member, clutch element, clutch operating lever and lever-operating cam, said end plate providing an end journal for said shaft; a pintle for said cam extending through said end plate; a manual cam-operating lever on said pintle outside said end plate and operatively connected with said cam; a biasing spring inside said housing and acting on said cam to bias it in either direction away from an intermediate position; and means for actuating said driving member including a transmission and an adjustable friction brake acting on said transmission.

7. In a fishing reel, in combination; a spool having end flanges and a shaft; a clutch element coaxial with said spool and encircling said shaft; a driving connection between said spool and said element permitting a predetermined limited amount of lost motion between them by substantially helical movement of said clutch element with respect to said spool; a driving member coaxial with said clutch element; said clutch element and driving member having opposed cooperating clutch teeth adapted to drive the spool only in the direction of reeling in a line thereon, said clutch teeth having driving faces helically arranged with respect to the axis of the spool; the pitch of the lost motion connection between said spool and said clutch element being relatively low and the pitch of the driving faces being relatively high; resilient means on the spool shaft normally urging said clutch element into clutching engagement with said driving member, said clutch element having an annular abutment surface; a clutch operating lever having one end arranged to engage said abutment surface, a pivotal support for the other end of said lever; cam means engaging said lever intermediate its ends to tilt said lever and disengage said clutch; an end plate cooperating with the adjacent spool flange to form a housing for said driving member, clutch element, clutch operating lever and lever-operating cam, said end plate providing an end journal for said shaft; a pintle for said cam extending through said end plate; a manual cam-operating lever on said pintle outside said end plate and operatively connected with said cam; a biasing spring inside said housing and acting on said cam to bias it in either direction away from an intermediate position; and means for actuating said driving member including a transmission and an adjustable friction brake acting on said transmission.

8. In a fishing reel, in combination; a spool having end flanges and a shaft; a clutch element coaxial with said spool and encircling said shaft; a driving connection between said spool and said element permitting a predetermined limited amount of lost motion between them by substantially helical movement of said clutch element with respect to said spool; a driving member coaxial with said clutch element; said clutch element and driving member having opposed cooperating clutch teeth adapted to drive the spool only in the direction of reeling in a line thereon, said clutch teeth having driving faces helically arranged with respect to the axis of the spool; the pitch of the lost motion connection between said spool and said clutch element being relatively low and the pitch of the driving faces being relatively high; resilient means on the spool shaft normally urging said clutch element into clutching engagement with said driving member, said clutch element having an abutment surface; a clutch operating lever having one end arranged to engage said abutment surface, a pivotal support for the other end of said lever; cam means engaging said lever intermediate its ends to tilt said lever and disengage said clutch; an end plate cooperating with the adjacent spool flange to form a housing for said driving member, clutch element, clutch operating lever and said shaft; a pintle for said cam extending through said end plate; a manual cam-operating lever on said pintle outside said end plate and operatively connected with said cam; a biasing spring inside said housing and acting on said cam to bias it in either direction away from an intermediate position; and means for actuating said driving member including a transmission and an adjustable friction brake acting on said transmission.

9. In a fishing reel, in combination; a spool having end flanges and a shaft; a clutch element coaxial with said spool and encircling said shaft; a driving connection between said spool and said element permitting a predetermined limited amount of lost motion between them by substantially helical movement of said clutch element with respect to said spool; a driving member coaxial with said clutch element; said clutch element and driving member having opposed cooperating clutch teeth adapted to drive the spool only in the direction of reeling in a line thereon, said clutch teeth having driving faces helically arranged with respect to the axis of the spool; the pitch of the lost motion connection between said spool and said clutch element being relatively low and the pitch of the driving faces being relatively high; and means for actuating said driving member.

10. In a fishing reel, in combination; a spool having end flanges and a shaft; a clutch element coaxial with said spool and encircling said shaft; a driving connection between said spool and said element permitting a predetermined limited amount of lost motion between them by substantially helical movement of said clutch element with respect to said spool; a driving member coaxial with said clutch element; said clutch element and driving member having opposed cooperating clutch teeth adapted to drive the spool only in the direction of reeling in a line thereon, said clutch teeth having driving faces helically arranged with respect to the axis of the spool; the pitch of the lost motion connection between said spool and said clutch element being relatively low and the pitch of the driving faces being relatively high; resilient means on the spool shaft normally urging said clutch element into clutching engagement with said driving member, said clutch element having an abutment surface; a clutch operating lever having one end arranged to engage said abutment surface; and independent means for actuating said driving member and said clutch operating lever.

JOHN V. SCHAFER.